United States Patent
Kling et al.

(10) Patent No.: US 11,156,126 B2
(45) Date of Patent: Oct. 26, 2021

(54) FAN CASE WITH INTERLEAVED LAYERS

(71) Applicant: United Technologies Corporation, Farmington, CT (US)

(72) Inventors: Colin J. Kling, Souderton, PA (US); Darin S. Lussier, Guilford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 428 days.

(21) Appl. No.: 16/369,376

(22) Filed: Mar. 29, 2019

(65) Prior Publication Data

US 2020/0025034 A1    Jan. 23, 2020

Related U.S. Application Data

(60) Provisional application No. 62/657,252, filed on Apr. 13, 2018.

(51) Int. Cl.
| | | |
|---|---|---|
| *F01D 25/24* | (2006.01) | |
| *B29C 70/22* | (2006.01) | |
| *B29C 70/32* | (2006.01) | |
| *B29L 31/00* | (2006.01) | |

(52) U.S. Cl.
CPC ............ *F01D 25/24* (2013.01); *B29C 70/228* (2013.01); *B29C 70/32* (2013.01); *B29L 2031/7504* (2013.01); *F05D 2220/36* (2013.01); *F05D 2240/14* (2013.01); *F05D 2300/6034* (2013.01)

(58) Field of Classification Search
CPC .. F01D 25/24; F05D 2220/36; F05D 2240/14; F05D 2300/6034; B29C 70/228; B29C 70/32; B29C 70/08; B29D 99/006; B29D 99/0082
See application file for complete search history.

(56) References Cited

U.S. PATENT DOCUMENTS

| | | | | |
|---|---|---|---|---|
| 6,652,222 | B1* | 11/2003 | Wojtyczka | ............... B32B 3/12 415/200 |
| 7,713,021 | B2 | 5/2010 | Finn et al. | |
| 7,905,972 | B2* | 3/2011 | Xie | ......................... B29C 70/32 156/189 |

(Continued)

FOREIGN PATENT DOCUMENTS

| | | |
|---|---|---|
| EP | 2865866 | 4/2015 |
| EP | 2915742 | 9/2015 |

(Continued)

OTHER PUBLICATIONS

European Search Report for European Patent Application No. 19169024.7 completed Jun. 18, 2019.

*Primary Examiner* — Eldon T Brockman
(74) *Attorney, Agent, or Firm* — Carlson, Gaskey & Olds, P.C.

(57) ABSTRACT

A fan case for a gas turbine engine includes an annular liner and an annular case body. The liner has a plurality of liner fiber layers. The case body surrounds the liner. The case body includes a plurality of first and second fiber layers. The first fiber layers extend axially beyond the second fiber layers in axially forward and aft directions and the second fiber layers are interleaved with the first fiber layers. The first fiber layers each have a first fiber architecture and the second fiber layers each have a second, different fiber architecture.

20 Claims, 3 Drawing Sheets

(56) References Cited

U.S. PATENT DOCUMENTS

| | | | |
|---|---|---|---|
| 8,092,169 B2 | 1/2012 | Cloft et al. | |
| 8,672,609 B2 | 3/2014 | Lussier et al. | |
| 8,757,958 B2 | 6/2014 | Lussier | |
| 8,827,629 B2 | 9/2014 | Voleti et al. | |
| 9,017,814 B2 * | 4/2015 | Xie | F01D 21/045 428/411.1 |
| 9,249,530 B2 * | 2/2016 | Yoon | B29C 53/582 |
| 9,482,111 B2 | 11/2016 | Costa et al. | |
| 9,840,936 B2 | 12/2017 | Lussier et al. | |
| 10,119,423 B2 | 11/2018 | Kling et al. | |
| 2006/0201135 A1 | 9/2006 | Xie et al. | |
| 2009/0098284 A1 * | 4/2009 | Xie | B29C 70/22 427/177 |
| 2009/0098337 A1 * | 4/2009 | Xie | F01D 21/045 428/121 |
| 2010/0077721 A1 | 4/2010 | Marshall | |
| 2014/0352838 A1 * | 12/2014 | Yoon | B29B 11/16 139/317 |
| 2015/0118036 A1 * | 4/2015 | Ohtani | F04D 29/023 415/200 |
| 2015/0315922 A1 | 11/2015 | Roach et al. | |
| 2016/0281738 A1 | 9/2016 | Finnigan et al. | |
| 2016/0369812 A1 | 12/2016 | Kling et al. | |
| 2019/0160765 A1 * | 5/2019 | Le Hong | C04B 35/806 |

FOREIGN PATENT DOCUMENTS

| | | |
|---|---|---|
| EP | 3106289 | 12/2016 |
| EP | 3293366 | 3/2018 |
| WO | 2012018919 | 2/2012 |

* cited by examiner

FAN CASE WITH INTERLEAVED LAYERS

CROSS-REFERENCE TO RELATED APPLICATION

This application claims benefit of U.S. Provisional Application No. 62/657,252 filed Apr. 13, 2018.

BACKGROUND

Fan containment cases are designed to contain fan blades during a blade release event. Various types of constructions are known. Example fan containment cases may include a hardwall construction that contains a released fan blade or a softwall construction that has an inner structure that carries normal operational loads combined with an outer fabric wrap that catches and contains the released fan blade. Composite fan containment case designs are generally lighter than metallic designs.

SUMMARY

A fan case for a gas turbine engine includes an annular liner and an annular case body. The liner may have a plurality of liner fiber layers. The case body surrounds the liner. The case body may include a plurality of first and second fiber layers. The first fiber layers may extend axially beyond the second fiber layers in axially forward and aft directions and the second fiber layers are interleaved with the first fiber layers. The first fiber layers each have a first fiber architecture and the second fiber layers each have a second fiber architecture that is different than the first architecture.

In a further embodiment of any of the foregoing embodiments, the first fiber architecture and the second fiber architecture differ by fiber angle.

In a further embodiment of any of the foregoing embodiments, the liner fiber layers include aramid fibers, and the first fiber layers and the second fiber layers include carbon fibers.

In a further embodiment of any of the foregoing embodiments, the first fiber architecture and the second fiber architecture differ by fiber pattern type.

In a further embodiment of any of the foregoing embodiments, at least one of the first fiber architecture or the second fiber architecture is a triaxial braid.

In a further embodiment of any of the foregoing embodiments, the annular case body has a minimum of five of the first fiber layers and five of the second fiber layers.

In a further embodiment of any of the foregoing embodiments, the second fiber layers are interleaved with the first fiber layers in a repeating pattern. The repeating pattern has a repeat unit that has an equal number of first and second fiber layers.

In a further embodiment of any of the foregoing embodiments, the second fiber layers are interleaved with the first fiber layers in a repeating pattern. The repeating pattern having a repeat unit that has an unequal number of first and second fiber layers.

In a further embodiment of any of the foregoing embodiments, the repeat unit has a ratio of first fiber layers to second fiber layers of 2:1.

In a further embodiment of any of the foregoing embodiments, the annular case body includes inner and outer skin layers between which the first and second fibers layers are disposed. The inner skin layer in contact with the annular liner.

In a further embodiment of any of the foregoing embodiments, the second fiber layers are axially offset from the annular liner.

A fan case for a gas turbine engine according to an example of the present disclosure includes an annular liner that has a plurality of aramid fiber layers. The annular liner defines a radially outer surface. An annular case body is contiguous with the radially outer surface. The annular case body has a plurality of first carbon fiber layers and a plurality of second carbon fiber layers. The first carbon fiber layers extends axially beyond the second carbon fiber layers in axially forward and aft directions and the second carbon fiber layers are interleaved with the first carbon fiber layers. The first fiber layers each have a first fiber architecture with regard to fiber angle orientation and the second fiber layers each have a second, different fiber architecture with regard to fiber angle orientation.

In a further embodiment of any of the foregoing embodiments, the first and second fiber architectures are triaxial braids, and the fiber angle orientations of the triaxial braids relative to a 0° circumferential direction differ by at least 20°.

In a further embodiment of any of the foregoing embodiments, the first fiber architecture and the second fiber architecture differ by fiber pattern type.

In a further embodiment of any of the foregoing embodiments, the second fiber layers are interleaved with the first fiber layers in a repeating pattern. The repeating pattern has a repeat unit that has an equal number of first and second fiber layers.

In a further embodiment of any of the foregoing embodiments, the second fiber layers are interleaved with the first fiber layers in a repeating pattern. The repeating pattern has a repeat unit that has an unequal number of first and second fiber layers.

In a further embodiment of any of the foregoing embodiments, the repeat unit has a ratio of first fiber layers to second fiber layers of 2:1.

In a further embodiment of any of the foregoing embodiments, the second fiber layers are axially offset from the annular liner.

A method of fabricating a fan case for a gas turbine engine according to an example of the present disclosure includes constructing an annular case body around an annular liner. The annular case body has a plurality of first fiber layers and a plurality of second fiber layers. The first fiber layers extend axially beyond the second fiber layers in axially forward and aft directions and the second fiber layers are interleaved with the first fiber layers. The first fiber layers each have a first fiber architecture and the second fiber layers each have a second, different fiber architecture. The constructing includes simultaneously wrapping at least one of the first fiber layers and at least one of the second fibers layers together around a mandrel.

In a further embodiment of any of the foregoing embodiments, the constructing includes simultaneously wrapping multiple ones of the first fiber layers and one of the second fibers layers together around a mandrel.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
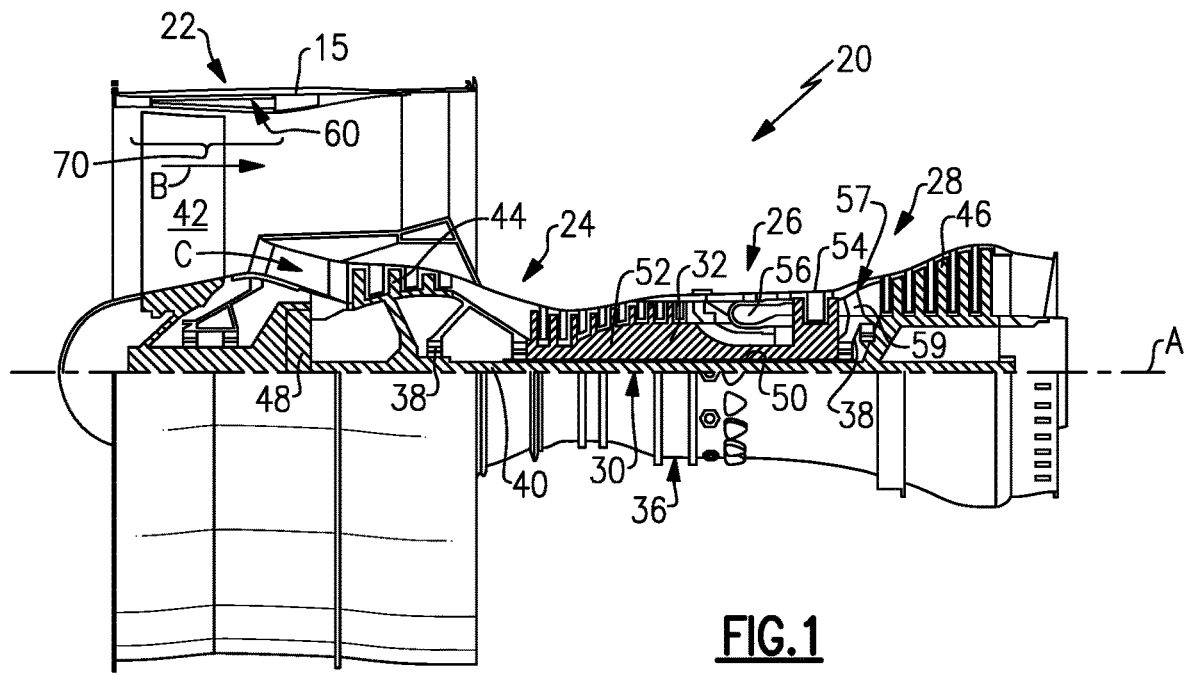
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
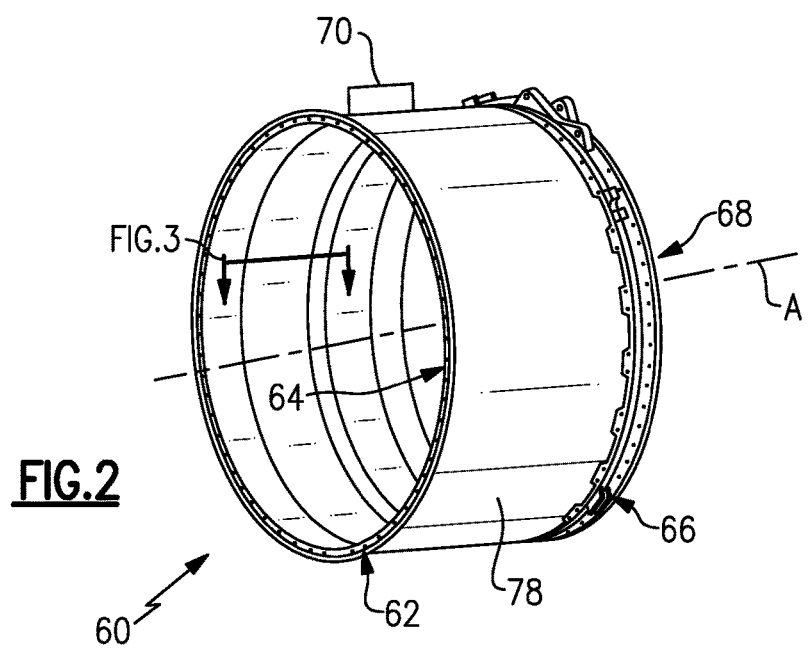
FIG. 2 illustrates an isolated view of an example fan case.

The engine 20 further includes a fan (containment) case 60 within the nacelle 15. FIG. 2 illustrates an isolated view of the fan case 60, which is generally cylindrical about the engine central axis A. In this example, the fan case 60 includes an attachment flange 62 at its forward end 64 and a mounting ring 66 at its aft end 68. The flange 62 and mounting ring 66 serve to secure the fan case 60 to another engine structure. As will be appreciated, the flange 62 and mounting ring 66 are merely examples of attachment features and the fan case 60 may additionally or alternatively employ other types of mounting features.

The fan case 60 includes a containment zone, represented at 70. The containment zone 70 is the portion of the fan case 70 that is designed to contain the blade or blades of the fan 42 in the event of a blade release. Blade release is rare but can occur if the engine ingests a foreign object, for example. In such an event, a blade may strike the fan case 60 in the containment zone 70. The containment zone 70 is generally more robust than the other portions of the fan case 60, in order to contain and capture the released blade. In this regard, as will be explained in more detail below, the fan case 60 contains a particular construction in order to provide enhanced containment in a slim, lightweight profile.

Figure 3:
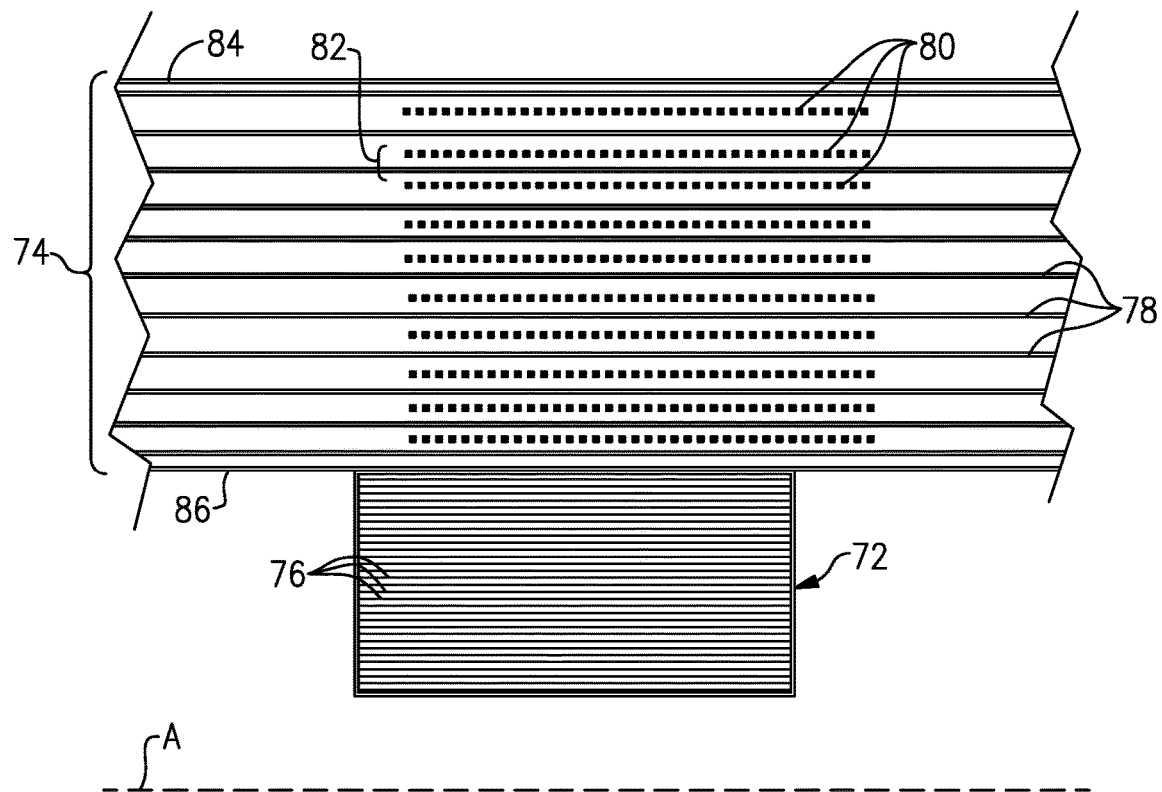
FIG. 3 illustrates a sectioned view of the fan case of FIG. 2.

FIG. 3 illustrates a section of the fan case 60 according to the section line shown in FIG. 2 (i.e., a section taken alone a plane that contains the engine central axis A). As can be appreciated, for purposes of more clearly illustrating various features of the construction, FIG. 3 may not be to scale. Furthermore, the structures discussed are annular and are understood to extend entirely around the engine central axis A.

The fan case 60 includes an annular liner 72 and an annular body case 74. The liner 72 is generally radially inwards of the body case 74. In this example, the liner 72 is entirely radially inwards of the body case 74. Each of the liner 72 and the body case 74 are constructed of fiber reinforced composites, which include fiber layers embedded in a matrix (which may also be referred to as a resin). Most typically in the engine 20, the matrix will be a thermoset resin, such as but not limited to, epoxy.

As used herein a "fiber layer" refers to an arrangement of fibers in a continuous sheet or sheet-like form that is of substantially uniform thickness. A fiber layer may, at least initially, have only the fibers, but after infusion of the polymer matrix the fiber layer also then includes the polymer matrix. The fibers in a fiber layer may be single filaments but more typically will be bundles of filaments in the form of tows or yarns. As an example, a single tow may have several thousand filaments. The tows or yarns of a fiber layer may be arranged in a fiber architecture, which here refers to an ordered arrangement of the tows or yarns relative to one another in a fiber layer. Fiber architectures may differ by the type of pattern employed, i.e., the fiber pattern type. Example fiber pattern types may include, but are not limited to, unidirectional, 2- or 3-dimensional woven, triaxial braid, and non-crimp fabric. There may also be variations within a fiber pattern type, such as the relative angles of the tows to one another.

The liner 72 in FIG. 3 includes a plurality of fiber layers 76 (several of which are identified by "76" in FIG. 3). The liner 72, being the most radially inward situated portion of the fan case 60, serves as the first measure of blade containment. In this regard, the liner 72 acts to spread or distribute the initial impact load of a released blade. The liner 72 thus must have high impact and cutting resistance. For example, the fibers of the liner 72 are high-strain fibers, such as aramid fibers.

The case body 74 surrounds the liner 72. The case body 74 includes a plurality of first fiber layers 78 and a plurality of second fiber layers 80. The second fiber layers 80 are shown in FIG. 3 by dotted lines in order to visually distinguish from the first fiber layers 78. In the illustrated example, the first fiber layers 78 are axially longer than the second fiber layers 80. For instance, the first fiber layers 78 extend axially beyond the second fiber layers 80 in axially forward and aft directions. The second fiber layers 80 are also interleaved with the first fiber layers 78. That is, the second fiber layers 80 are disposed between the first fiber layers 78 in an alternating fashion. In this example, the second fiber layers 80 are also axially offset from the liner 72. For instance, the second fiber layers 80 and the liner 72 axially overlap but the forward end of the second fiber layers 80 is aft of the forward end of the liner 72 and the aft end of the second fiber layers 80 is aft of the aft end of the liner 72. The offset serves to position the second fiber layers 80 to receive the released blade as it moves rearwards upon impact with the liner 72.

The first fiber layer 78 has a first fiber architecture and the second fiber layer 80 has a second fiber architecture that differs from the first fiber architecture. The differing architectures provide the fan case 60 with different attributes, depending on the selected architectures. Furthermore, the interleaved construction provides enhanced load distribution, to enhance containment performance.

The kinds of fibers, fiber architectures, and fiber pattern types employed in the first and second fiber layers 78/80 can be varied. In examples, the kinds of fibers may be glass fibers, carbon fibers, aramid fibers, or combinations of these. In further examples, the first and second fiber layers 78/80 may differ in fiber architecture. This can be achieved by using differing fiber pattern types (e.g., unidirectional and braided) or by using the same fiber pattern types but with differing fiber angles (e.g., 0°, +/−25° braid and 0°, +/−45° braid). Unless stated otherwise, the 0° angle used herein is the circumferential direction about the engine central axis A.

In a further example, the first and second fiber layers 78/80 are composed of carbon fiber tows. In a further example, the first and second fiber layers 78/80 differ in fiber pattern types wherein the layers 78/80 are different ones of unidirectional, 2- or 3-dimensional woven, triaxial braid, and non-crimp fabric. In a further example, the first and second layers 78/80 have the same fiber pattern type but differ by fiber angle. In one example, the first fiber layer 78 is a 0°, +/−60° triaxial braid and the second fiber layer 80 is a 0°, +/−45° triaxial braid. In further examples of the above examples, the fibers of the liner 72 are aramid fibers. In further examples of the above examples, the first and second fiber layers 78/80 contain only carbon fibers and the liner 72 contains only aramid fibers. In a further example, the case body 74 is composed only of the first and second fiber layers 78/80. Examples in which the first fiber layer 78 is a 0°, +/−60° triaxial braid and the second fiber layer 80 is a 0°, +/−45° triaxial braid may be particularly useful. The 0°, +/−60° triaxial braid provides quasi-isotropic properties, which is desirable for the overall fan case 60. The 0°, +/−45° triaxial braid provides greater stiffness in the hoop (circumferential) direction and thus serves to reinforce the fan case 60 in the containment zone 70 for blade capture.

Figures 4, 5, 6, 7:
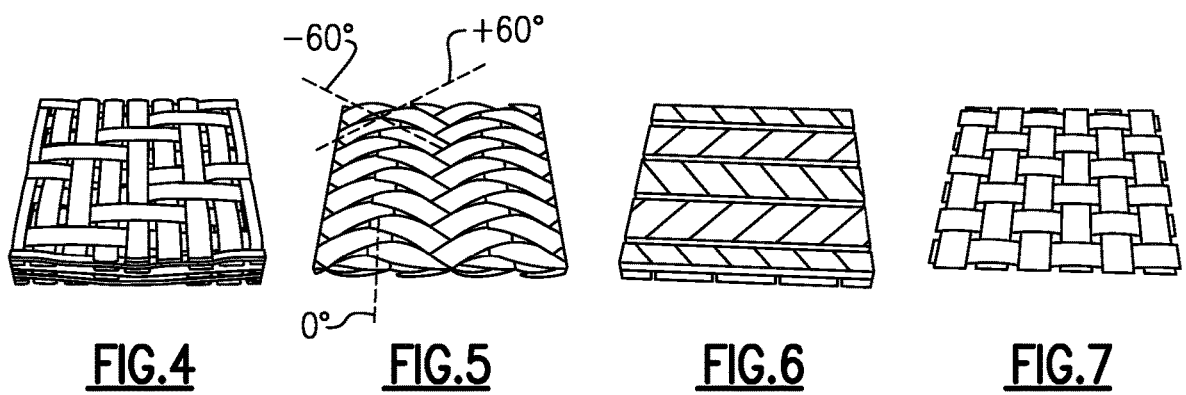
FIGS. 4, 5, 6, and 7 illustrate various fiber layer architectures.

FIGS. 4, 5, 6, and 7 illustrates example fiber architectures that may be used for the first and second fiber layers 78/80 and liner 72. FIG. 4 illustrates a 3-dimensional woven structure, FIG. 5 shows a triaxial braid structure, FIG. 6 illustrates a non-crimp fabric, and FIG. 7 illustrates a 2-dimensional woven structure. As an example to illustrate fiber angles, the fiber angles are denoted in the triaxial braid in FIG. 5.

In further examples, the first and second fiber layers 78/80 are provided in a repeating pattern having a repeat unit, which is shown in FIG. 3 at 82. In this case, the unit 82 includes one of the first layers 78 and one of the second layers 80. That is, the construction includes an equal number of first and second layers 78/80. Although the interleaved pattern is 1:1 in the illustrated example, in further examples the ratio in the repeat unit 82 may be 2:2, 3:3, 4:4 or higher. In one alternative, the numbers of layers 78/80 in the repeat unit 82 are unequal. In a further example, the repeat unit 82 has a greater number of the first layers 78 than the second layers 80. In one example, the ratio of the number of first layers 78 to the number of second layers 80 in the repeat unit 82 is 2:1. In other examples, the ratio is 3:1, 4:1, or 3:2.

Optionally, the case body 74 may also include inner and outer skin layers 84/86. Here, the skin layers 84/86 are identical to the first fiber layers 78. That is, at least one additional first fiber layer 78 is provided on the inner and outer sides.

Figure 8:
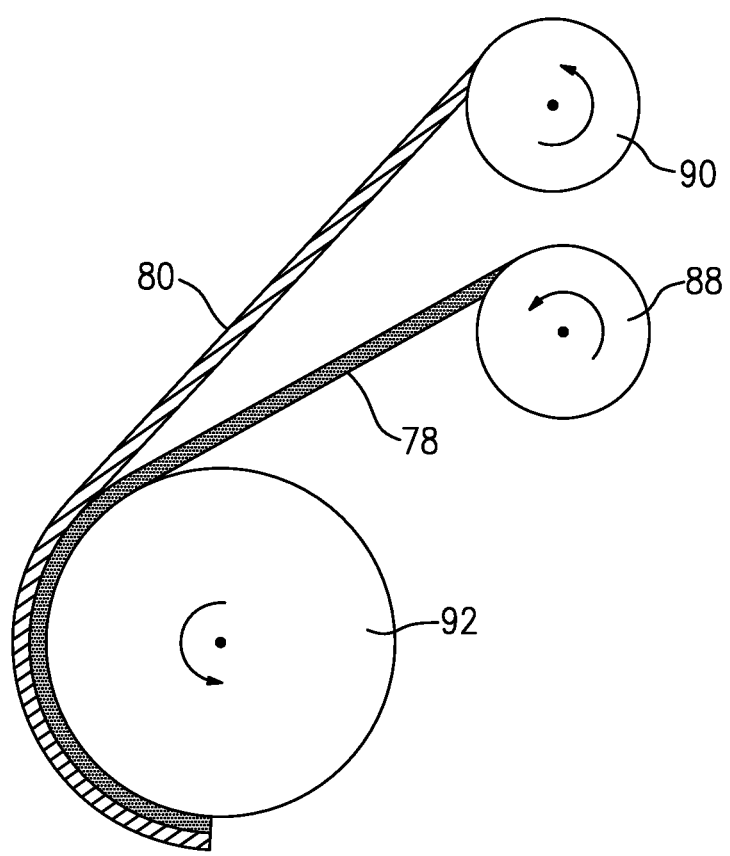
FIG. 8 illustrates an example method of fabricating a fan case.

FIG. 8 illustrates an example method of fabricating the fan case 60. The example method involves a winding procedure that is used to construct the case body 74. For instance, the first and second fiber layers 78/80 are initially sheets that are stored on rolls 88/90. The sheets of the fiber layers 78/80 are simultaneously unwound from the rolls 88/90 and wrapped onto a mandrel 92 to form the cylindrical shape of the fan case 60. The sheets of the fiber layers 78/80 may be wrapped a desired number of times around the mandrel 92 to form the desired number of fiber layers 78/80. In the case where there is more than one of the first fiber layers 78 or second fiber layers 80 in the repeat unit, one or more additional rolls of sheets of the first fiber layers 78 and/or second fiber layers 80 may be used and also simultaneously wrapped. The simultaneous wrapping reduces fabrication time. Rather than switching back a forth to wrap the layers 78/80, the layers 78/80 are wrapped at once, thereby saving the time it takes to switch over.

In some examples, the first and second fiber layers 78/80 may be dry off of the rolls 88/90 and the polymer matrix later infused into the fiber layers 78/80, such as in a transfer molding process. Alternatively, the layers 78/80 can be pre-impregnated with the resin. In some examples where the layers 78/80 are dry, a tackifier may be used to temporarily bind the layers 78/80 together on the mandrel 92, so that the layers 78/80 do not shift before molding. In additional examples, the layers 78/80 may be pre-bound on a single roll or stitched together. Where a thermoset is used for the polymer matrix, the mandrel 92 and wrapped layers 78/80 may be further subjected to a heating step, to facilitate curing of the thermoset polymer. The mandrel 92 may then be removed to obtain the final or near final fan case 60.

Upon impact of a released blade, layers in a containment case may delaminate. To some extent delamination serves to dissipate impact energy but it is desirable to reduce large scale delamination. In the fan case 60, the interleaving of the fiber layers 78/80 serves to distribute impact load through the structure and thereby reduce load concentrations that may otherwise lead to delamination. The examples herein may be especially useful in case designs that are made by wrapping, which limits the architectures that are available. The simultaneous wrapping technique herein can be used to make the interleaved construction of the fiber layers 78/80, thereby enabling an architecture for enhanced performance.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A fan case for a gas turbine engine comprising:
    an annular liner including a plurality of liner fiber layers; and
    an annular case body surrounding the annular liner, the annular case body including a plurality of first fiber layers and a plurality of second fiber layers, the first fiber layers extending axially beyond the second fiber layers in axially forward and aft directions and the second fiber layers are interleaved with the first fiber layers, wherein the first fiber layers each have a first fiber architecture and the second fiber layers each have a second, different fiber architecture.

2. The fan case as recited in claim 1, wherein the first fiber architecture and the second fiber architecture differ by fiber angle.

3. The fan case as recited in claim 1, wherein the liner fiber layers include aramid fibers, and the first fiber layers and the second fiber layers include carbon fibers.

4. The fan case as recited in claim 1, wherein the first fiber architecture and the second fiber architecture differ by fiber pattern type.

5. The fan case as recited in claim 4, wherein at least one of the first fiber architecture or the second fiber architecture is a triaxial braid.

6. The fan case as recited in claim 5, wherein the annular case body has a minimum of five of the first fiber layers and five of the second fiber layers.

7. The fan case as recited in claim 1, wherein the second fiber layers are interleaved with the first fiber layers in a repeating pattern, the repeating pattern having a repeat unit that has an equal number of first and second fiber layers.

8. The fan case as recited in claim 1, wherein the second fiber layers are interleaved with the first fiber layers in a repeating pattern, the repeating pattern having a repeat unit that has an unequal number of first and second fiber layers.

9. The fan case as recited in claim 8, wherein the repeat unit has a ratio of first fiber layers to second fiber layers of 2:1.

10. The fan case as recited in claim 1, wherein the annular case body includes inner and outer skin layers between which the first and second fibers layers are disposed, the inner skin layer in contact with the annular liner.

11. The fan case as recited in claim 1, wherein the second fiber layers are axially offset from the annular liner.

12. A fan case for a gas turbine engine comprising:
    an annular liner including a plurality of aramid fiber layers, the annular liner defining a radially outer surface; and
    an annular case body contiguous with the radially outer surface, the annular case body including a plurality of first carbon fiber layers and a plurality of second carbon fiber layers, the first carbon fiber layers extending axially beyond the second carbon fiber layers in axially forward and aft directions and the second carbon fiber layers are interleaved with the first carbon fiber layers, wherein the first fiber layers each have a first fiber architecture with regard to fiber angle orientation and the second fiber layers each have a second, different fiber architecture with regard to fiber angle orientation.

13. The fan case as recited in claim 12, wherein the first and second fiber architectures are triaxial braids, and the fiber angle orientations of the triaxial braids relative to a 0° circumferential direction differ by at least 20°.

14. The fan case as recited in claim 12, wherein the first fiber architecture and the second fiber architecture differ by fiber pattern type.

15. The fan case as recited in claim 12, wherein the second fiber layers are interleaved with the first fiber layers in a repeating pattern, the repeating pattern having a repeat unit that has an equal number of first and second fiber layers.

16. The fan case as recited in claim 12, wherein the second fiber layers are interleaved with the first fiber layers in a repeating pattern, the repeating pattern having a repeat unit that has an unequal number of first and second fiber layers.

17. The fan case as recited in claim 16, wherein the repeat unit has a ratio of first fiber layers to second fiber layers of 2:1.

18. The fan case as recited in claim 12, wherein the second fiber layers are axially offset from the annular liner.

19. A method of fabricating a fan case for a gas turbine engine, the method comprising:
   constructing an annular case body around an annular liner, the annular case body including a plurality of first fiber layers and a plurality of second fiber layers, the first fiber layers extending axially beyond the second fiber layers in axially forward and aft directions and the second fiber layers are interleaved with the first fiber layers, wherein the first fiber layers each have a first fiber architecture and the second fiber layers each have a second, different fiber architecture,
   wherein the constructing includes simultaneously wrapping at least one of the first fiber layers and at least one of the second fibers layers together around a mandrel.

20. The method as recited in claim 19, wherein the constructing includes simultaneously wrapping multiple ones of the first fiber layers and one of the second fibers layers together around a mandrel.

\* \* \* \* \*